(12) United States Patent
Koren et al.

(10) Patent No.: US 10,277,511 B2
(45) Date of Patent: Apr. 30, 2019

(54) HASH-BASED PACKET CLASSIFICATION WITH MULTIPLE ALGORITHMS AT A NETWORK PROCESSOR

(71) Applicant: Freescale Semiconductor Inc., Austin, TX (US)

(72) Inventors: Shai Koren, Raanana (IL); Evgeni Ginzburg, Petah Tikva (IL); Yuval Harari, Tel-Aviv (IL); Adi Katz, Ramat Gan (IL); Roman Nos, Petah Tikva (IL)

(73) Assignee: NXP USA, Inc., Austin, TX (US)

( * ) Notice: Subject to any disclaimer, the term of this patent is extended or adjusted under 35 U.S.C. 154(b) by 116 days.

(21) Appl. No.: 14/970,712

(22) Filed: Dec. 16, 2015

(65) Prior Publication Data

US 2017/0180253 A1    Jun. 22, 2017

(51) Int. Cl.
*H04L 12/743* (2013.01)
*H04L 29/06* (2006.01)
*H04L 12/741* (2013.01)
*G06F 17/30* (2006.01)

(52) U.S. Cl.
CPC ...... *H04L 45/7453* (2013.01); *G06F 17/3033* (2013.01); *H04L 45/745* (2013.01); *H04L 69/22* (2013.01)

(58) Field of Classification Search
CPC ................................. H04L 45/00; H04L 69/00
See application file for complete search history.

(56) References Cited

U.S. PATENT DOCUMENTS

| 8,539,199 | B2 * | 9/2013 | Burroughs | ............ | G06F 9/3851 |
|---|---|---|---|---|---|
| | | | | | 707/747 |
| 2004/0190526 | A1 * | 9/2004 | Kumar | ................. | H04L 45/302 |
| | | | | | 370/395.21 |
| 2014/0269686 | A1 * | 9/2014 | Srinivasan | .......... | H04L 49/3009 |
| | | | | | 370/357 |
| 2015/0244842 | A1 * | 8/2015 | Laufer | ................... | H04L 69/22 |
| | | | | | 370/392 |

\* cited by examiner

*Primary Examiner* — Andrew Lai
*Assistant Examiner* — Sumitra Ganguly

(57) ABSTRACT

A network processor has a "bi-level" architecture including a classification algorithm level and a single-record search level to search a hash database that stores packet classification information based on packet field values. The classification algorithm level implements multiple different classification algorithm engines, wherein the individual algorithm applied to a received packet can be selected based on a field of the packet, a port at which the packet was received, or other criteria. Each classification algorithm engine generates one or more single-record search requests to search the hash database for classification information based on one or more field values of the received packet or other classification parameters. Each single-record search requests is provided to the single-record search level, which executes the requests at the hash database and returns the corresponding record to the requesting classification algorithm engine.

20 Claims, 4 Drawing Sheets

HASH-BASED PACKET CLASSIFICATION WITH MULTIPLE ALGORITHMS AT A NETWORK PROCESSOR

BACKGROUND

Field of the Disclosure

The present disclosure relates generally to network processors and more particularly to packet classification at a network processor.

Description of the Related Art

A network processor typically receives and processes received packets by, for example, routing each received packet to one of a plurality of output ports based on an address field of the packet. Early network processors processed packets on a "first-received, first-served" basis whereby packets were generally processed in the order received. However, as network traffic has grown more complex, network processors have been configured to implement more refined processing sequences according to the types of packets received. To apply such refined processing sequences, a network processor typically must classify each received packet into one or more types through application of a packet classification algorithm. However, as the type and character of network traffic changes, fixed or simple classification algorithms may be insufficient for efficient processing of received packets.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for classifying packets at a network processor having a "bi-level" architecture including a classification algorithm level and a single-record search level to search a hash database that stores packet classification information based on packet field values. The classification algorithm level implements multiple different classification algorithm engines, wherein the individual algorithm applied to a received packet by a corresponding classification algorithm engine can be selected based on a field of the packet, a port at which the packet was received, or other criteria. Each classification algorithm engine generates one or more single-record search requests to search the hash database for classification information based on one or more field values of the received packet and/or other classification parameters. Each single-record search request is provided to the single-record search level, which executes the requests at the hash database and returns the corresponding record to the requesting classification algorithm engine. By sharing the hash record search level among the different classification algorithm engines, the design and implementation process for the classification algorithm engines is simplified, allowing the network processor to implement multiple classification algorithms more efficiently.

To illustrate via an example, the network processor may receive two general types of packets that require two different classification algorithms: packets requiring an "exact match" algorithm (e.g., Ethernet packets) and packets requiring a "longest prefix match" (LPM) algorithm (e.g., Internet Protocol version 6 (IPv6 packets)). Conventionally, a network processor implements each algorithm independently, with independent hash databases, independent hash search engines, and the like. This approach requires a large number of resources (e.g., memory space to store the different databases, processing resources to accommodate the search engines, and the like) and cannot easily implement new classification algorithms, as each engine must be designed from scratch. In contrast, using the techniques described herein, a network processor implements a plurality of different classification algorithms that share a common single-record search engine to search a common hash database. This reduces the number of resources separately consumed by each classification algorithm. In addition, the network processor can be redesigned or reprogrammed to accommodate new classification algorithms relatively easily.

Figure 1:
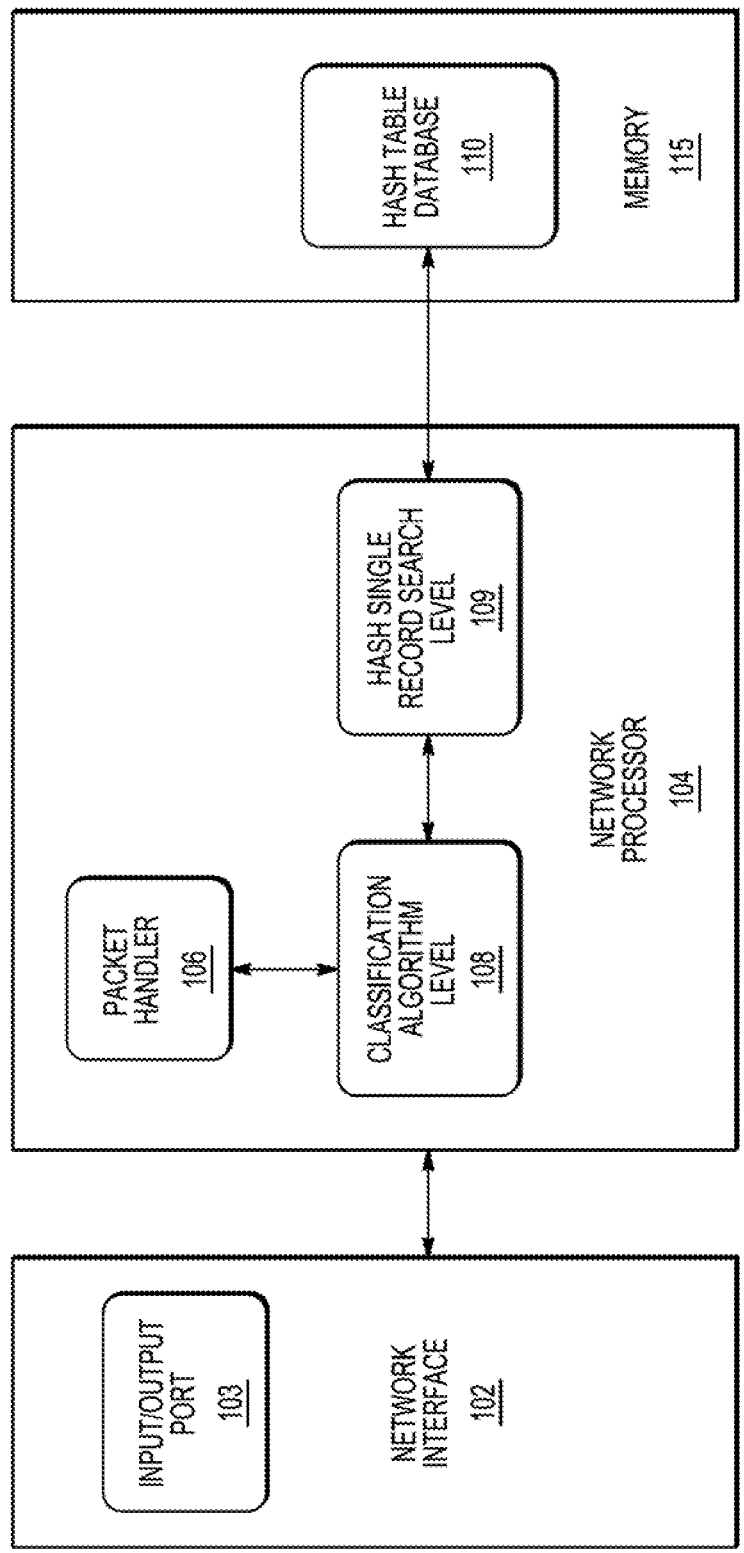
FIG. 1 is a block diagram of a network processor employing a modular bi-level search architecture to search a hash database for packet classification in accordance with at least one embodiment.

FIG. 1 illustrates a block diagram of a network device 100 in accordance with at least one embodiment. The network device 100 can be any of a number of network devices, such as a router, a network switch, a hardware firewall, a session border controller, a network monitoring device, a network security device such as a network intrusion detector, and the like. The network device 100 is generally configured to receive packets from a connected network (not shown) such as a local area network (LAN) or wide area network such as the Internet, to classify the received packets, and to take one or more actions for each received packet based on the received packet's classification. Examples of actions that can be taken by the network device 100 include routing a received packet to one or more output ports, dropping or otherwise blocking the packet from further communication, generating a notification of a potential security breach or network problem, and the like. For purposes of further description, it is assumed that the network device 100 is a router whose primary function is to route received packets to one or more output ports based on address fields of the received packets. Thus, the packet classification of the network device 100 is directed to identifying the output ports for each received packet based on the address fields.

To facilitate packet reception and classification, the network device 100 includes a network interface 102, a network processor 104, and a memory 115. The network interface 102 is hardware generally configured to receive packets from and communicate packets to the connected network. The network interface 102 therefore provides at least a physical (PHY) layer interface to the network, and can additionally perform one or more operations for higher layers of the Open Systems interconnection (OSI) model. In at least one embodiment, the network interface 102 is generally configured to have a plurality of input ports to receive packets from the network and a plurality of output ports to communicate packets to the network (e.g., input/output port 103). The input and output ports may each be associated with individual hardware connections to the network, or may be virtualized ports that share the individual hardware connections.

At least some of the packets received at the network interface 102 include a header and a data payload. The header includes a plurality of fields indicating one or more characteristics of the packet, such a source address for the packet, a destination address, quality of service (QOS) information for the packet, and the like. As described further below, the information in the header fields of the packet can be employed by the network device 100 to classify received packets into one or more groups, referred to as "flows." The network device 100 can then execute a corresponding set of actions for each flow, such as routing the packets of a flow to a corresponding output port, dropping the packets of a flow, modifying the packets of a flow, and the like.

The memory 115 is a set of one or more memory modules configured to store and retrieve data in response to corresponding memory access requests. Accordingly, the memory 115 can be volatile memory such as random access memory (RAM), non-volatile memory such as Flash memory, and the like, or a combination thereof. The memory 115 stores a hash table database 110 including a plurality of entries. Each entry includes a plurality of fields, including one or more index fields and one or more classification fields. The hash fields store data corresponding to a range of index values of packet header data. For example, the index fields of an entry can store data indicative of a range of source addresses for received packets. In at least one embodiment, the range of possible index values for index field correspond to the range of an associated hash function used to generate the index values, as described further herein.

The classification field of an entry of the hash table database 110 stores a value indicating a class for packets having header information that matches the corresponding index values of the entry. In at least one embodiment, the classification field stores a rule indicating an action to be taken for packets having header information that matches the index values, such as "drop packet", "route packet to address", and the like. An example of a portion of the hash table database 110 is set forth in Table 1 below:

TABLE 1

| Network Layer Source Address | Network Layer Destination Address | Transport Layer Source Address | Transport Layer Destination Address | Class |
|---|---|---|---|---|
| X1.X2.X3.X4 | Y1.Y2.Y3.Y4 | N/A | N/A | Deny |
| X1.X2.X3.X5 | Y1.Y2.Y3.Y4 | www | udp | Route to Port 2 |
| X1.X2.X3.X5 | X1.X2.X3.X5 | www | tcp | Deny |
| X1.X2.X3.X6 | X1.X2.X3.X5 | N/A | N/A | Route to Port 5 |

In Table 1, the Network Layer Source Address, Network Layer Destination Address, Transport Layer Source Address, and Transport Layer Destination Address columns correspond to index fields and the Class column corresponds to a classification field. It will be appreciated that although the index fields of Table 1 are shown with specific values, in at least one embodiment one or more of the index fields represents a broader range of values, such as a range of address values.

The network processor 104 is a processor configured to classify received packets by accessing the hash table database 110. In at least one embodiment, the network processor 104 is an application specific integrated circuit (ASIC) specially designed with hardcoded logic to execute the operations described further herein. In at least one other embodiment, the network processor 104 is a general purpose processor that executes sets of instructions, organized as one or more computer programs, to execute one or more of the operations described herein. In yet another embodiment, the network processor 104 includes some hard-coded logic modules specially designed and configured to execute at least some of the operations described herein, and also includes one or more processor cores to execute computer program instructions to execute other operations described herein. In at least one other embodiment, the network processor 104 is composed of one or more programmable logic blocks, such as a programmable logic array, field programmable gate array, and the like, programmed to perform the operations described herein. To support packet classification and processing, the network processor 104 includes a packet handler 106, a classification algorithm level 108, and a hash single-record search level 109. In at least one embodiment, one or more of the packet handler 106, the classification algorithm level 108, and the hash single-record search level 109 is a hardcoded logic including one or more circuits designed and constructed to execute the operations described herein. For example, one or more of these modules can be realized as a field programmable gate array (FPGA) programmed so that the gates and other circuitry of the FPGA are connected to execute the operations described herein. In at least one other embodiment, one or more of these modules is a software module including instructions to manipulate a processor core (not shown) of the network processor 104 to execute the operations described herein.

The packet handler 106 is configured to receive packets from the network interface 102, analyze each received packet to identify a classification algorithm for the packet. In at least one embodiment, the packet handler 106 identifies the classification algorithm based on information in the header of the packet. For example, the header of the packet may itself indicate a preferred classification algorithm for the packet. In another embodiment, the packet handler 106 identifies the classification algorithm based on header information indicating a type of data carried by the payload of the packet, based on a source address of the packet, based on a destination address of the packet, and the like, or a combination thereof. In still another embodiment, the packet handler 106 identifies the classification algorithm for a packet based on a port number for the port on which the packet was received.

To illustrate via an example, in at least one embodiment the network device 100 may receive two types of packets: Ethernet packets and IPv6 packets. Further, a stored classification policy (not shown) for the network device 100 can require that Ethernet packets be classified according to an exact match algorithm and IPv6 packets be classified according to an LPM algorithm. For each received packet, the packet handler 106 identifies whether the packet is an Ethernet packet or an IPv6 packet based on the packet header, the port of the network interface 102 at which the packet was received, or a combination thereof. Based on the identified packet type, the packet handler 106 selects the corresponding classification algorithm and provides the packet to the classification algorithm level 108, along with a command indicating the selected classification algorithm.

The classification algorithm level 108 implements the different classification algorithms supported by the network device 100. In at least one embodiment, each supported algorithm is implemented by a set of dedicated hardware, processor executing software, or combination thereof, referred to for purposes of description as an algorithm engine. Each algorithm engine is configured to execute the corresponding classification algorithm by generating a sequence of one or more single-record searches for the hash table database 110. As used herein, a single-record search refers to a search of a hash table that returns a single record from the hash table. The classification algorithm level 108 provides the sequences of single-record searches to the hash single-record search level 109, which executes each single-record search as described further below, and returns the result to the requesting algorithm engine. The algorithm engine analyzes the results and, based on the classification algorithm, generates additional single-record searches or returns a classification result for the packet to the packet handler 106.

To illustrate via an example, in at least one embodiment the classification algorithm level 108 includes an exact match engine and an LPM engine. The exact match engine attempts to find an exact match for an address field of a received packet by generating a single-record search for an entry of the hash table database 110 having an index field (or multiple index fields) that matches a hash value generated by applying a specified hash function to a corresponding address field (or multiple header fields) of the received packet. Thus, the exact match engine may generate only one single-record request or, in any case, a relatively small number of single-record requests. The LPM engine attempts to find at the hash table database 110 a set of one or more entries that exactly match an address field of a received packet and from the matching entries identifies the entry having the longest subnet mask. Accordingly, the LPM engine generates multiple single-record search requests for the hash table database 110, each search request including the same address field but different subnet masks. The LPM engine analyzes the results to determine the request result with the longest subnet mask to determine the classification for the packet. Thus, the different algorithm engines can generate different numbers of single-record search requests, different types of single-record search requests (e.g., search requests to match different index fields), and the like, to implement the corresponding classification algorithm.

The hash single-record search level 109 is configured to receive single-record search requests from the classification algorithm level 108, to execute one or more hash functions on fields of the search requests to generate a set of one or more hash values, and to search the hash table database 110 according to one or more known hash table lookup techniques, and to return results of each search request to the classification algorithm level 108. Each result is either a single entry of the hash table database 110 that matches the search request or an indication than no matching entry was found.

In at least one embodiment, the classification algorithm level 108 and single-record search level 109 support modifications of entries of the hash table database 110. Accordingly, one or more of the algorithm engines of the classification algorithm level 108 can generate a single-record modification request to modify an entry of the hash table database 110. The single-record search level 109 receives the request, locates the targeted entry of the hash table database 110, and modifies the entry according to the request.

The hash table database 110 can be configured to support the two-level structure of the network processor 104. For example, in at least one embodiment each entry of the hash table database 110 includes a set of "search fields" that are used by the single-record search level 109 to identify if the corresponding record is responsive to a search request. These search fields can include, for example record validity fields, pointer fields to support hash chaining, and the like. To support searches by the single record search level 109, these search fields can be standardized, such that they are always located in the same relative position of an entry, no matter which algorithm engine created or modified the entry. In addition, each entry includes a set of "algorithm fields" that are employed by the algorithm engines of the classification algorithm level to classify received packets. These algorithm fields can be non-standardized in that their contents or relative position in a given entry can depend on the particular algorithm engine that created or modified the entry.

In at least one embodiment, the classification algorithm level 108 and the hash single-record search level 109 are configured to operate independently, such that each level is not "aware" of the operations of the other. Thus, for example, the classification algorithm level 108 operates independently of the particular search techniques employed by the hash single-record search level 109, such as caching of search requests, hash chaining to execute a search request, generation of memory access requests to the memory 115 to search the hash table database 110, and the like. Similarly the hash single-record search level 109 operates independently of the algorithms implemented by each algorithm engine of the classification algorithm level 108, such as conditional operations at an algorithm engine that generates additional single-record search requests.

By providing the hash single-record search level 109 as a search engine that is shared between the algorithm engines of the classification algorithm level 108, and by supporting independent operation of the levels 108 and 109, the network processor 104 enhances the flexibility of the network device 100. For example, new algorithm engines can be added to the classification algorithm level 108 relatively simply by adding hardware or software that implements the algorithm at a high level, without regards to the particular search techniques employed by the hash single-record search level 109. In contrast, new search algorithms can be added to a conventional network device only by designing and implementing both the high level search algorithm and the lower level database search operations. In addition, the independence of the levels 108 and 109 allows each level to be modified without extensive redesign or reimplementation of the other level. For example, the hash single-record search level 109 can be reconfigured to implement a new, more efficient search technique or hash function to search the hash table database 110 without extensive modification or redesign of the algorithm engines of the classification algorithm level 108. Moreover, the independence of the hash single-record search level 109 from the classification algorithm level 108 allows the different algorithm engines to share the hash table database 110, improving memory utilization.

In addition, the independence of the levels 108 and 109 can enhance efficiency at the network processor 104. For example, in at least one embodiment the hash single-record search level 109 includes a plurality of search engines, with each search engine configured to execute single-record searches at the hash table database 110 independently of the other search engines, and in parallel with them. In response to receiving a single-record search request, the hash single-record search level 109 selects an available search engine and assigns the search request to the selected engine for execution. The hash single-record search level 109 thereby supports parallel independent execution of search requests for different algorithm engines, of multiple search requests from the same algorithm engine, or a combination thereof.

Figure 2:
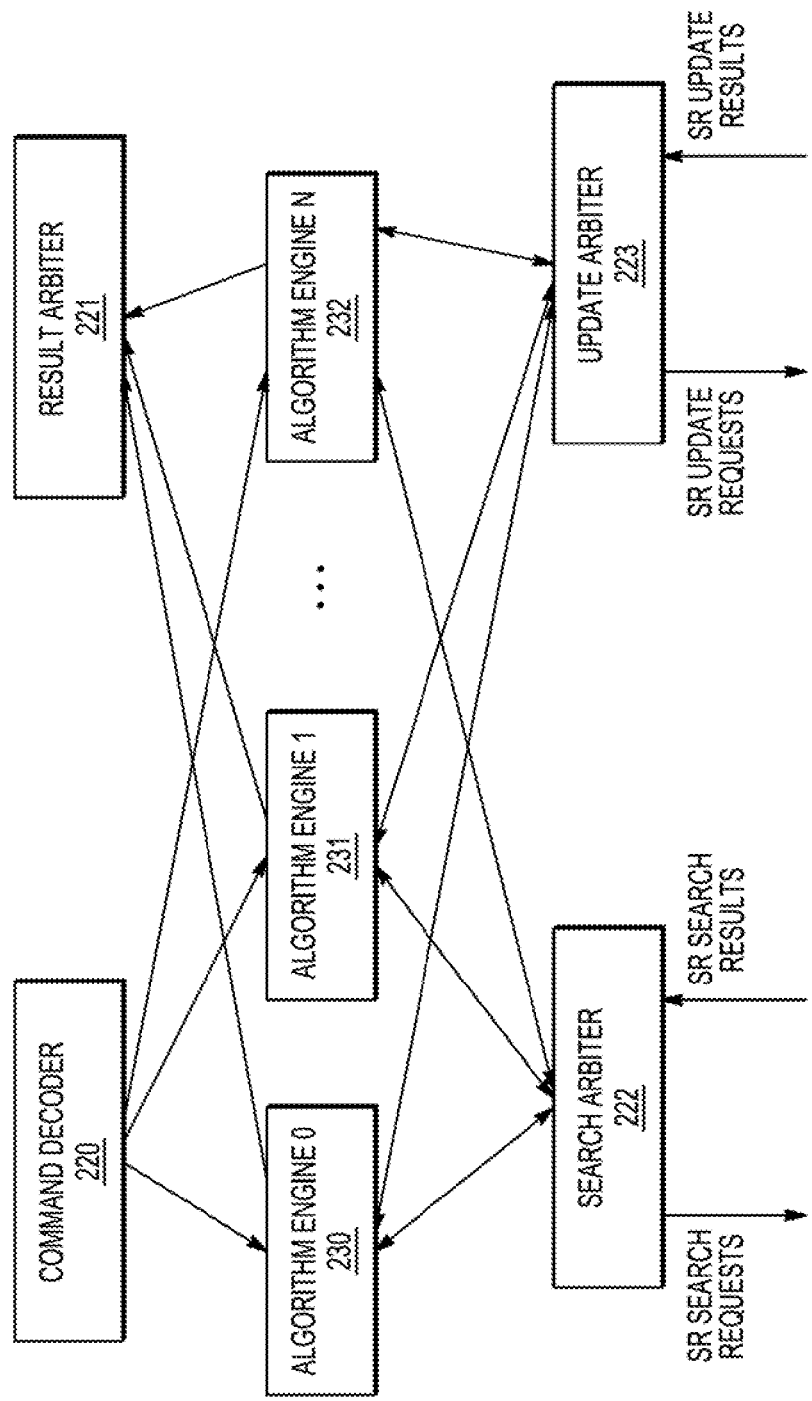
FIG. 2 is a block diagram of a classification algorithm level of the network processor of FIG. 1 in accordance with at least one embodiment.

FIG. 2 is a block diagram of the classification algorithm level 108 in accordance with at least one embodiment. In the depicted example, the classification algorithm level supports N classification algorithm engines (designated algorithm engines 230-232), where N is an integer. Each of the algorithm engines 230-232 implements a different classification algorithm for packets provided to the engine, and based on the algorithm generates one or more single-record search requests. To support the algorithm engines 230-232, the classification algorithm level 108 includes a command decoder 220, a result arbiter 221, a search arbiter 222, and an update arbiter 223.

The command decoder 220 is configured to receive commands from the packet handler 106, wherein each command includes a packet to be classified and the classification algorithm that is to be used to classify the packet. The command decoder 220 decodes the command and, based on the decoded command, provides the packet to the one of the algorithm engines 230-232 that implements the indicated classification algorithm.

The search arbiter 222 receives single-record search requests from the algorithm engines 230-232 and provides the received requests to the hash single-record search level 109 in an order according to an arbitration policy supported by the network processor 104. For example, in at least one embodiment, the network processor 104 supports a round-robin arbitration policy, and the search arbiter 222 proceeds through received search requests from the algorithm engines 230-232 in round-robin fashion, so that after providing a search request for a given algorithm engine, the search arbiter 222 does not provide another search request for that algorithm engine until it has provided search requests for each other algorithm engine that has a pending request. In at least one other embodiment, the network processor 104 supports a packet priority scheme, wherein the packet handler 106 indicates a priority for each packet. The search arbiter 222 then selects from among the pending single-record search requests based on the priority of the packets from which the search requests were generated. The packet handler can determine the priority for each packet based upon a quality of service value for each packet, a packet type (e.g., Ethernet packets vs. IPv6 packets), and the like, or a combination thereof.

In addition to providing single-record search requests, the search arbiter 222 receives the results of those single-record search requests from the hash single-record search level 109. The search arbiter 222 provides the results of each search request to the algorithm engine that generated the request. In at least one embodiment, the search arbiter 222 provides the results in an order according to the same arbitration policy used to determine the order in which the search requests were provided to the hash single-record search level 109.

The update arbiter 223 receives single-record modification requests from the algorithm engines 230-232 and provides the received requests to the hash single-record search level 109. The update arbiter 223 can provide the received modification requests in an order according to the arbitration policy supported by the network processor 104, similar to the search arbiter 222. The update arbiter 223 receives results for the modification requests from the single-record search level 109 and provides each result to the algorithm engine that generated the corresponding modification request.

The result arbiter 221 receives classification results for received packets from the algorithm engines 230-232 and provides the classification results to the packet handler 106. Based on the classification result for each packet, the packet handler 106 can take one or more corresponding actions indicated by the classification, such as routing the packet to a designated output port of the network interface 102, dropping the packet, modifying the packet, storing the packet, and the like. In at least one embodiment, the result arbiter 223 provides the classification results to the packet handler 106 in an order governed by the arbitration policy supported by the network processor 104.

Figure 3:
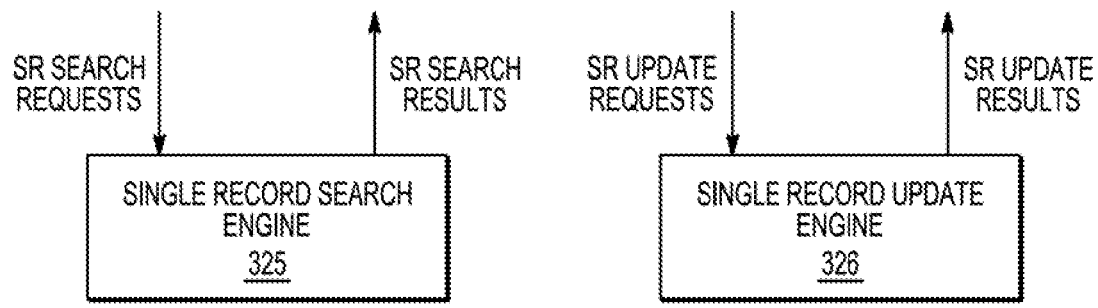
FIG. 3 is a block diagram of a single-record search level of the network processor of FIG. 1 in accordance with at least one embodiment.

FIG. 3 depicts a block diagram of the hash single-record search level 109 in accordance with at least one embodiment. In the illustrated example, the hash single-record search level includes a single-record search engine 325 and a single-record update engine 326. The single-record search engine 325 is configured to receive single-record search requests, to generate one or more hash values based on each of the single-record search requests according to a specified hash generation algorithm, and to search the hash table database 110 using the generated hash values, using known hash search techniques, to identify a matching entry. The single-record search engine 325 returns the matching entry to the classification algorithm level 108 as a result of the received single-record search. The single-record update engine 326 performs similar operations as the single-record search engine 325 for single-record update requests.

In at least one embodiment, the hash single-record search level 109 includes multiple instances of the single-record search engine 325 or multiple instances of the single-record update engine 326, or one or more instances of both engines 325, 326. Each instance can independently execute single-record search requests (or single-record update requests) in parallel with the other instances. In response to receiving a single-record search request, the hash single-record search level 109 identifies an available single-record search engine instance (that is, an instance that is not currently executing a search request) and provides the single-record search request to the instance for execution. The selection is independent of the algorithm engine that generated the request. Thus, any search request from any algorithm engine can be assigned to an instance, improving classification efficiency.

Figure 4:
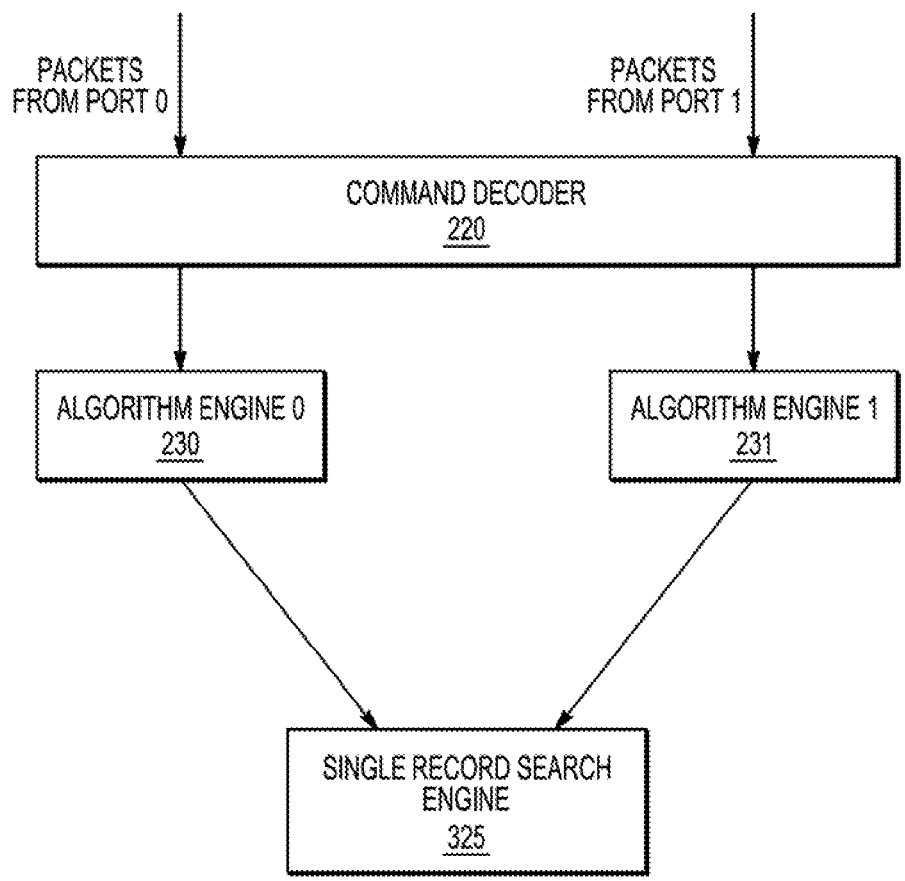
FIG. 4 is a block diagram of an example classification of packets using different classification algorithms at the network processor of FIG. 1 in accordance with at least one embodiment.

FIG. 4 illustrates a block diagram of an example packet classification operation at the network processor 104 of FIG. 1 in accordance with at least one embodiment. In the depicted example, the network processor employs different classification algorithms for different input ports of the network interface 102. In particular, packets received via a port designated "Port 0" are to be classified by a classification algorithm implemented by algorithm engine 230, while packets received via a port designated "Port 1" are to be classified by a classification algorithm implemented by algorithm engine 231. Accordingly the command decoder 220 provides packets received via Port 0 to algorithm engine 230, which generates a set of single-record search request based on the classification algorithm, and provides those single-record search requests to the single-record search engine 325 for execution. Similarly, the command decoder 220 provides packets received via Port 1 to algorithm engine 231, which generates a different set of single-record search request based on the classification algorithm, and provides those single-record search requests to the single-record search engine 325 for execution.

Thus, in the example of FIG. 4, the hash single-record search level 109 receives a set of single-record search requests from the classification algorithm level 108, with one subset of the set including single-record search requests from the algorithm engine 231 and a different subset of the set including single-record search requests from the algorithm engine 326. The subsets may include different number of single-record search requests, different types of single-record search requests (e.g. single-record search requests that request searches based on different index fields of the hash table database 110), but all the requests by search engine instances of the hash single-record search level 109. This allows the classification algorithm level 108 and hash single-record search level to operate independently, thereby supporting efficient implementation of a variety of different classification algorithms.

Figure 5:
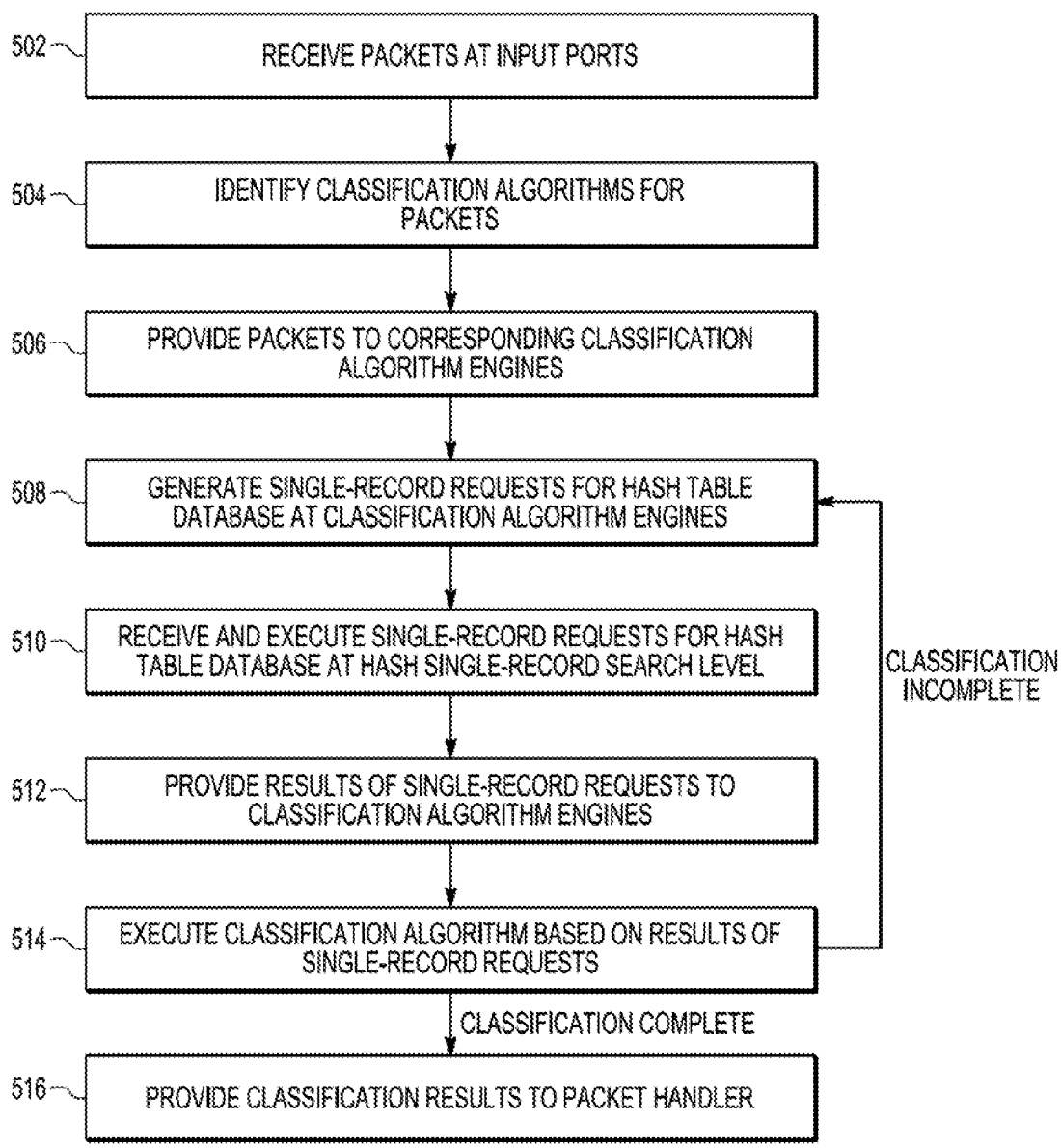
FIG. 5 is a flow diagram of a method of classifying packets at a network processor using multiple classification algorithm engines that share a common single-record search engine in accordance with at least one embodiment.

FIG. 5 is a flow diagram of a method 500 of classifying packets at a network device in accordance with at least one embodiment. The method 500 is described in the context of an example implementation at the network device 100 of FIG. 1. At block 502, the network interface 102 receives packets from the connected network at one or more input ports, and provides the received packets to the packet handler 106 at the network processor 104. At block 504, the packet handler 106 identifies, for each received packet, a corresponding classification algorithm to be used to classify the packet. The identification can be based on the input port at which the packet was received, a header field of the packet, an inspection of the data payload of the packet, and the like, or any combination thereof.

At block 506 the packet handler 106 issues, for each packet, a command to the classification algorithm level 108 indicating the classification algorithm identified for the packet, along with the packet itself. The classification algorithm level 108 provides each packet to the algorithm engine that implements the classification algorithm identified for the packet. At block 508 the algorithm engines of the classification algorithm level 108 generate, according to their corresponding algorithms, single-record search requests for the hash table database 110. At block 510, the hash single-record search level 109 receives the set of single-record search requests generated by the algorithm engines. The set includes subsets of single-record search requests, with each subset including the single-record search requests for a different one of the algorithm engines. The hash single-record search level 109 executes each subset of single-record search requests at the hash table database 110. At block 512 the hash single-record search level 109 provides the results of the single-record search requests to the corresponding algorithm engines at the classification algorithm level 108. At block 514 the algorithm engines execute their corresponding classification algorithms based on the single-record search request results. In some cases, a classification algorithm may require additional single-record searches to classify a received packet, such as a tree search algorithm that searches nodes of a tree, with each node requiring a different single-record search request based on the results of a previous single-record search request. If a classification algorithm has not completed classification for a received packet, the method flow for that classification algorithm returns to block 508 and the corresponding algorithm engine generates additional single-record search requests.

Returning to block 514, when an algorithm engine has completed classification, the method flow for that classification engine moves to block 516 and the algorithm engine provides the classification results to the packet handler 106, which takes one or more actions for each packet based upon its classification, such as routing the packet to a particular output port of the network interface 102, dropping the packet, and the like.

In at least one embodiment, the method flow of the method 500 can also be employed to modify records of the hash table database 110. In particular, at block 508 one or more of the algorithm engines of the classification algorithm level 108 can generate single-record modification requests for the hash table database 110. At block 510, the hash single-record search level 109 receives the set of single-record modification requests generated by the algorithm engines. The set includes subsets of single-record modification requests, with each subset including the single-record modification request for a different one of the algorithm engines. The hash single-record search level 109 executes each subset of single-record modification requests at the bash table database 110 to locate and modify a single record for each request. At block 512 the hash single-record search level 109 provides any results of the single-record modification requests to the corresponding algorithm engines at the classification algorithm level 108.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    at a network processor, receiving at a shared hash table search engine a plurality of single-record search requests for a hash table from a plurality of packet classification algorithm engines, wherein:
        each of the plurality of single-record search requests return a single record from the shared hash table search engine shared among the plurality of packet classification algorithm engines; and
        each of the plurality of packet classification algorithm engines is configured to execute a different classification algorithm;
    generating, at the shared hash table search engine, memory access requests to access the hash table based on the plurality of single-record search requests at the shared hash table search engine;
    providing, from the shared hash table search engine, single-record responses to each of the plurality of single-record search requests; and
    classifying, at the network processor, a plurality of packets received at the network processor based on the single-record responses.

2. The method of claim 1, further comprising:
    receiving a first packet of the plurality of packets at the network processor;
    selecting a first packet classification algorithm engine from the plurality of packet classification algorithm engines based on information comprised in the first packet; and
    generating, based on the first packet, a first subset of the plurality of single-record search requests at the first packet classification algorithm engine.

3. The method of claim 2, further comprising:
    receiving a second packet of the plurality of packets at the network processor;
    selecting a second packet classification algorithm engine from the plurality of packet classification algorithm engines based on information comprised in the second packet, wherein the second packet classification algorithm engine is different from the first packet classification algorithm engine; and
    generating, based on the second packet, a second subset of the plurality of single-record search requests at the second packet classification algorithm engine.

4. The method of claim 3, wherein the first subset of the plurality of single-record search requests includes a different number of single-record search requests than the second subset of the plurality of single-record search requests.

5. The method of claim 3, wherein the first packet classification algorithm engine classifies the first packet based on a first number of classification rules and the second packet classification algorithm engine classifies the second packet based on a second number of classification rules, wherein the first number of classification rules is different from the second number of classification rules.

6. The method of claim 5, further comprising:
    arbitrating between the first subset of the plurality of single-record search requests and the second subset of the plurality of single-record search requests to select a single-record search request and providing the selected single-record search request to the hash table search engine.

7. The method of claim 2, further comprising:
    receiving from one of the plurality of packet classification algorithm engines a single-record modification request to modify an entry of the hash table; and
    executing the single-record modification request at the hash table search engine shared among the plurality of packet classification algorithm engines.

8. The method of claim 2, wherein selecting the first packet classification algorithm engine comprises selecting the first packet classification algorithm engine based on a field of the first packet.

9. The method of claim 2, wherein selecting the first packet classification algorithm engine comprises selecting the first packet classification algorithm engine based on a port number of the network processor from which the first packet was received.

10. A network processor comprising:
    a plurality of hardware packet classification algorithm engines at a classification algorithm level configured to generate a plurality of single-record search requests for a hash table, wherein:
        each of the plurality of single-record search requests return a single record; and
        each of the plurality of hardware packet classification algorithm engines is configured to execute a different classification algorithm;
    a shared hash table search engine, the shared hash table search engine to provide single-record responses to each of the plurality of single-record search requests; and
    the plurality of hardware packet classification algorithm engines configured to share the shared hash table search engine, the shared hash table search engine to execute the plurality of single-record search requests by generating memory access requests to access the hash table based on the plurality of single-record search requests, the plurality of hardware packet classification algorithm engines configured to classify a plurality of packets received at the network processor based on the executed plurality of single-record search requests.

11. The network processor of claim 10, further comprising:

a packet handler configured to receive a first packet of the plurality of packets and to select a first packet classification algorithm engine from the plurality of hardware packet classification algorithm engines based on the first packet; and wherein the first packet classification algorithm engine is to generate a first subset of the plurality of single-record search requests based on the first packet.

12. The network processor of claim 11, wherein:

the packet handler is configured to receive a second packet of the plurality of packets and is configured to select a second packet classification algorithm engine from the plurality of hardware packet classification algorithm engines based on the second packet, wherein the second packet classification algorithm engine is different from the first packet classification algorithm engine; and wherein the second packet classification algorithm engine is to generate a second subset of the plurality of single-record search requests based on the second packet.

13. The network processor of claim 12, wherein the first subset of the plurality of single-record search requests includes a different number of single-record search requests than the second subset of the plurality of single-record search requests.

14. The network processor of claim 12, wherein the first packet classification algorithm engine classifies the first packet based on a first number of classification rules and the second packet classification algorithm engine classifies the second packet based on a second number of classification rules, wherein the first number of classification rules is different from the second number of classification rules.

15. The network processor of claim 14, further comprising:

an arbiter configured to arbitrate between the first subset of the plurality of single-record search requests and the second subset of the plurality of single-record search requests to select a single-record search request for provision to the shared hash table search engine.

16. The network processor of claim 15, wherein the arbitrating comprises arbitrating based on a first quality of service value associated with the first packet and a second quality of service value associated with the second packet.

17. The network processor of claim 11, wherein the packet handler is to select the first packet classification algorithm engine based on a field of the first packet.

18. The network processor of claim 11, wherein the packet handler is to select the first packet classification algorithm engine based on a port number of the network processor from which the first packet was received.

19. A non-transitory computer readable storage medium storing instructions that, when executed by a processor, manipulate the processor to execute a method comprising:

receiving from a plurality of packet classification algorithm engines at a shared hash table search engine a plurality of single-record search requests for a hash table; wherein each of the plurality of single record search requests return a single record from the shared hash table search engine shared among the plurality of packet classification algorithm engines; and each of the plurality of packet classification algorithm engines is configured to execute a different classification algorithm;

executing the plurality of single-record search requests at the shared hash table search engine shared among the plurality of packet classification algorithm engines by generating, at the shared hash table search engine, memory access requests to access the hash table based on the plurality of single-record search requests at the hash table search engine;

providing, from the shared hash table search engine, single-record responses to each of the plurality of single-record search requests; and classifying a plurality of packets received at the network processor based on the single-record responses.

20. The computer readable storage medium of claim 19, wherein the method further comprising:

receiving a first packet of the plurality of packets;

selecting a first packet classification algorithm engine from the plurality of packet classification algorithm engines based on the first packet; and generating a first subset of the plurality of single-record search requests at the first packet classification algorithm engine based on the first packet.

* * * * *